(12) United States Patent
Hackett

(10) Patent No.: US 11,443,244 B2
(45) Date of Patent: Sep. 13, 2022

(54) PARALLEL ENSEMBLE OF MACHINE LEARNING ALGORITHMS

(71) Applicant: International Business Machines Corporation, Armonk, NY (US)

(72) Inventor: Charles E. Hackett, Greenlawn, NY (US)

(73) Assignee: INTERNATIONAL BUSINESS MACHINES CORPORTATION, Armonk, NY (US)

(*) Notice: Subject to any disclaimer, the term of this patent is extended or adjusted under 35 U.S.C. 154(b) by 770 days.

(21) Appl. No.: 16/431,802

(22) Filed: Jun. 5, 2019

(65) Prior Publication Data

US 2020/0387834 A1  Dec. 10, 2020

(51) Int. Cl.
*G06N 20/20* (2019.01)
(52) U.S. Cl.
CPC .................... *G06N 20/20* (2019.01)
(58) Field of Classification Search
CPC ...................................... G06N 20/20
See application file for complete search history.

(56) References Cited

U.S. PATENT DOCUMENTS

| | | | | |
|---|---|---|---|---|
| 7,280,987 | B2 * | 10/2007 | Chen ...................... | G06N 3/086 702/6 |
| 10,600,000 | B2 * | 3/2020 | Shamir .................. | G06N 20/00 |
| 10,977,571 | B2 * | 4/2021 | Miserendino .......... | G06N 20/00 |
| 2018/0293498 | A1 * | 10/2018 | Campos ................ | G06N 3/105 |
| 2018/0357543 | A1 * | 12/2018 | Brown ................... | G06F 30/20 |
| 2019/0095756 | A1 * | 3/2019 | Agrawal ............... | G06K 9/6271 |

FOREIGN PATENT DOCUMENTS

CN  108764486 A  11/2018

OTHER PUBLICATIONS

Kotsiantis, Sotiris, "Combining Bagging, Boosting, Rotation Forest and Random Subspace Methods," Artificial Intelligence Review 35, No. 3, 2011, pp. 223-240.
Tsymbal Alexey, et al., "Ensemble Feature Selection with the Simple Bayesian Classification," Information Fusion 4, No. 2, 2003, pp. 87-100.
Wei, Hai, et al., "A Novel Ensemble Classifier Based on Multiple Diverse Classification Methods," 2014 11th International Conference on Fuzzy Systems and Knowledge Discovery (FSKD), IEEE, 2014, pp. 301-305.

* cited by examiner

*Primary Examiner* — Abdullahi E Salad
(74) *Attorney, Agent, or Firm* — Cantor Colburn LLP; Teddi Maranzano

(57) ABSTRACT

An aspect of the invention includes receiving machine learning (ML) training data that includes a plurality of features for a plurality of observations. The ML training data is broken into a plurality of non-overlapping subsets of features and observations. A first ML algorithm is trained based on a first subset of the features and observations, and a second ML algorithm is trained based on a second subset of the features and observations. The training of the first ML algorithm overlaps in time with the training of the second ML algorithm. The first and second ML algorithms are tested. Either the first or second ML algorithm is selected based at least in part on results of the testing. The selected ML algorithm is retained as a trained ML algorithm for predicting one or more of the plurality of features based on one or more others of the plurality of features.

20 Claims, 11 Drawing Sheets

PARALLEL ENSEMBLE OF MACHINE LEARNING ALGORITHMS

BACKGROUND

The present invention generally relates to machine learning algorithms, and more specifically, to parallel training and testing of machine learning algorithms.

Contemporary machine learning algorithms are often designed in a laboratory environment based on a relatively small amount of data. As the amount of data increases the amount of resources utilized by a machine learning algorithm increases along with an increase in overall processing elapsed time.

SUMMARY

According to one or more embodiments of the present invention a non-limiting example computer-implemented method includes receiving machine learning (ML) training data that includes a plurality of features for a plurality of observations. The ML training data is broken into a plurality of non-overlapping subsets of features and observations. A first ML algorithm is trained based on a first subset of the features and observations, and a second ML algorithm is trained based on a second subset of the features and observations. The training of the first ML algorithm overlaps in time with the training of the second ML algorithm. The first and second ML algorithms are tested. Either the first or second ML algorithm is selected based at least in part on results of the testing. The selected ML algorithm is retained as a trained ML algorithm for predicting one or more of the plurality of features based on one or more other features of the other plurality of features.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
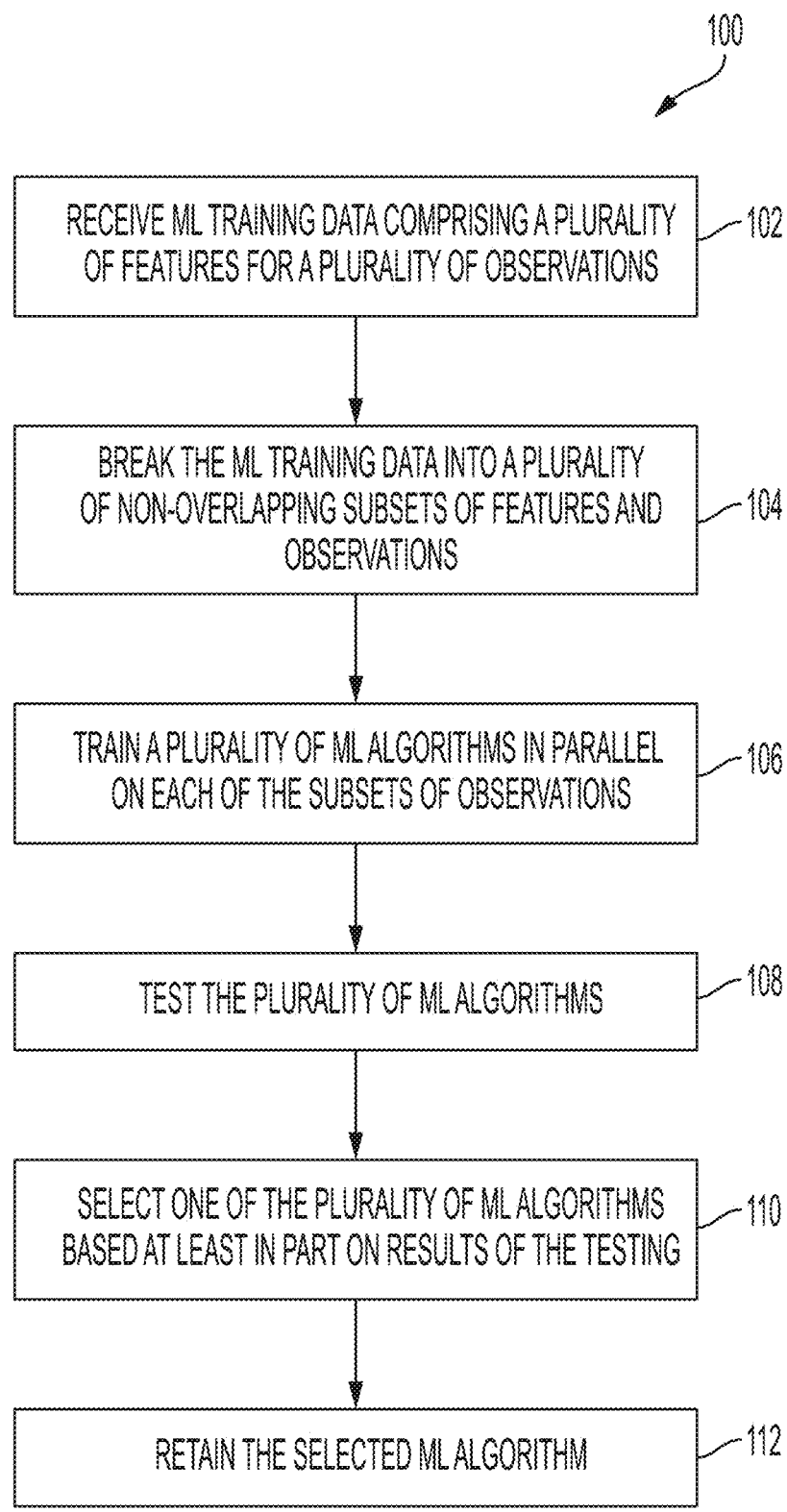
FIG. 1 depicts a high level flow diagram of a machine learning (ML) training and testing system according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention apply machine learning (ML) algorithms in parallel to subsets of a very large training data set and build an ensemble of trained ML algorithms. The ensemble can have several members, each member corresponding to a different combination of features in the training data set, with each member having an associated error level which indicates an accuracy of using the combination of features corresponding to the member to predict a class variable feature.

One or more embodiments of the present invention are agnostic to the actual ML algorithm used. This is contrasted with contemporary ML accelerants which are specific to a particular type of ML algorithm. One or more embodiments of the present invention include a system that allows a generic ML algorithm to train in parallel on subsets of data from an input training data set, and then provides validation and testing of the resulting ML algorithms across common sets of validation and test data. The most accurate ML algorithm of the ensemble member is included in the ensemble. Once the ensemble has completed successfully, the ensemble can be used in induction mode in a production environment. The ensemble presents a simple interface to the user of the ensemble as if it were a single deployed ML algorithm. Typical uses for the trained ensemble are classification and regression tasks.

Because the work of training is spread across a parallel configuration, the turnaround time of the overall training can be reduced. One or more embodiments of the present invention can exploit a wide range of parallel configurations, from tightly coupled clustered servers to a wide range of non-homogeneous servers (e.g., in a grid or cloud). One or more embodiments of the present invention include a resource scheduler that is cognizant of performance characteristics of the configurations and is responsible for optimum use of the platform.

One or more embodiments of the present invention fragment data used to train and test a ML algorithm into blocks based on features and sets of observations. The blocks are aggregated by block number as block sets, where the observations are coherent across the blocks, and the data observations are split between training, second level validation, and test sets. In accordance with one or more embodiments of the present invention, an ensemble of members is built where each member is a distinct combination of features. The ensemble members are processed against subsets of the block sets (referred to herein as "block groups") where the content is constrained to the features being processed. In accordance with one or more embodiments of the present invention, each ensemble member performs a ML training process on each block group independently of the other block groups for this ensemble member, and they can be performed in parallel. Also, each ensemble member is independent of the other ensemble members and can be processed in parallel with the other ensemble members. The best performing trained machine learner for each ensemble member is identified using the second level validation data to calculate a validation error. Each ensemble member's vote is weighted using the validation error, and the overall ensemble's accuracy is calculated using the test data against each ensemble member's most accurate trained machine learner with their weighted votes. The process can be terminated when the ensemble's accuracy reaches a user defined threshold.

One or more embodiments of the present invention include a ML training and testing system that is implemented by components that include a primary process, a health checker, a data manager, a compute farm, and a test center. It will be appreciated by those skilled in the art that embodiments are not limited to these components as two or more of these components may be combined, one or more components may be separated into other components, and/or addition or fewer functions may be performed by the components to implement embodiments of the ML training and testing system.

The primary process of the ML training and testing system can include a user front-end for interfacing with a user, and it can initiate the system and provide an exit for the system. In accordance with one or more embodiments of the present invention, the ensemble is contained in the primary process. The ensemble houses the population of elite ensemble members (e.g., the highest performing ML algorithm(s) for the combination of features in the ensemble member) as well as a pipeline of pending ensemble members. In one or more embodiments of the present invention, the primary process coordinates the components of the system, and the problem statement and its parameters are in the primary process and are distributed to the system components for their use.

The scheduler can be responsible for the optimum use of the platform that is, maximizing throughput of the training and testing tasks and reducing the turnaround time of the overall process. This goal of optimizing use of the platform can be supported by keeping track of resource usage, resource availability, data positioning and transmission times, and performance characteristics of the individual ML training and testing processes. The scheduler can be responsible for preventing process bottlenecks. In addition, the scheduler can initiate ML training tasks on a compute farm.

The health checker of the ML training and testing system can contact each node of the platform at periodic times to ensure that the nodes are active, and it can gather statistics on usage from each node. The information gathered by the health checker is passed on to the scheduler.

The data manager can be composed of data manager nodes and is responsible for hosting the data that has been input into the system. In accordance with one or more embodiments of the present invention, all blocks of data are present in at least one copy with a main data manager process keeping track of where the blocks of data reside.

As used herein, the term "compute farm" refers to the aggregation of compute nodes where the ML training processing is performed. Each compute node can support multiple independent ML tasks and can also include processes for ML algorithm data preparation and trained ML algorithm offload. In accordance with one or more embodiments of the present invention, only the training data needed for the active tasks is stored in memory. The compute nodes can push data blocks to disk, according to a least recently used (LRU) algorithm, for example.

The test center can be responsible for running trained ML algorithms that have been trained in the compute farm against the second level validation data. This validation data can include the full block sets for all of the second level validation observations. Similarly, a second function of the test center can be to run the ensemble's selected ensemble members with their vote weights against the test data. Each ensemble member of the retained population contributes via voting to the overall ensemble's estimation of a correct answer. Voting weights are determined from the error values of the selected ensemble members, where more accurate ensemble members are weighted higher than less accurate ensemble members. In accordance with one or more embodiments of the present invention, the test data is the set of block sets for all of the test observations. In accordance with one or more embodiments of the present invention, the test center includes a collection of test center nodes that host the second level validation data and the test data. These two sets of data are used to determine the success of training and to inform the ensemble of progress.

Contemporary approaches for training ML data include Apache™ Mahout which includes an algorithm library for ML on Apache Hadoop® data. Once data is stored in an Apache Hadoop Distributed File System (HDFS), Mahout provides tools to automatically find meaningful patterns in the big data sets. Hadoop distributes data across a platform in large blocks of fully coherent observations. Multiple copies of the data are present, and the data is further divided into slices within the block. Parallel processing is supported by running a map task on each slice and then combining the results in a reduce step. The objective of Hadoop is to reduce the impact of disk latency and input/output (I/O) transfer time on overall execution time while gaining the benefit of parallelism. Computation occurs on the nodes where the data resides. The iterative nature of a ML training task is done within the map step. It is possible that the slice remains large in terms of the number of observations and that a kernel-based algorithm will experience $O(n^2)$ memory and $O(n^{2+})$ central processing unit (CPU) demand, where "n" is the number of observations in the dataset, and "O" is the computer science terminology used to describe how an algorithm's behavior changes with respect to the number of observations. Also, if the slice is small in terms of number of observations, the density of slices per node can cause a work queue backup on the computing node. The platform becomes saturated and needs more nodes and thus more copies of the data to be distributed. In addition, Hadoop does not directly support the sub-selection of features as provided by one or more embodiments of the present invention, in Hadoop this is the responsibility of the map task.

In contrast to the Apache Mahout approach, one of more embodiments of the present invention puts data into blocks by feature and sets of rows, and then stores the data in the data management nodes for transmission to compute nodes for computation. These blocks are small and are not row coherent in comparison to the blocks of Hadoop. One or more embodiments of the present invention establish coherence across the blocks of a block set. In accordance with one or more embodiments of the present invention, compute nodes maintain data blocks as needed, optimally in memory for immediate use by the ML algorithm and only use disk as a back store following LRU push out from memory. Using a back store in this manner can reduce the data retransmission of blocks across the platform network, which can reduce the contention on that network and also reduce the latency to ML algorithm training initiation. In one or more embodiments of the present invention described herein, the compute nodes retain available memory for the ML training processes. Because the data management nodes do not perform the ML calculations, they can fill their memory with data blocks which allows shorter latency to the compute nodes by avoiding disk I/O time. In one or more embodiments of the present invention, data management nodes can also use LRU to disk as a method of increasing the density of blocks per data management node.

Because of the difficulty of running an iterative algorithm on Hadoop, the Mahout library of common ML algorithms was created. This library allows the users to run ML tasks over the Hadoop architecture. One or more embodiments of the present invention differ from Apache Mahout by isolating ML tasks from the underlying system architecture. ML tasks can be used as they are in the lab, and embodiments of the ML training and testing system described herein can easily support algorithm experimentation. One or more embodiments of the present invention deliver zipped data for the block group as the input of the ML algorithm. Output from the training process is in the form of an unloaded ML algorithm and training statistics as determined by parameters. The parameters can be stored in a properties file, a well-known concept for driving a software process. Unload can take the form of a binary serialization or more formally predictive model markup language (PMML) or portable format for analytics (PFA). One or more embodiments of the present invention are architected to support ML algorithms directly and do not require a special library as required by Apache Mahout. In addition, one or more embodiments of the present invention provide a generic subspace method of feature selection, and present to the ML algorithm subsets of the rows to allow for more rapid training.

Another contemporary method of ML training is bootstrap aggregation, or "bagging." When bagging is applied, multiple subsets of the observations are sampled from the original data uniformly and each subset is used as input into a ML algorithm. Bagging is an ensemble technique, and the outputs of the bagging are averaged to get the result. In the bootstrap, all features are retained which informs the ML algorithm. One or more embodiments of the present invention instead uses different combinations of the features as ensemble members, then subsets by groups of observations to form the block groups, and then chooses the best performing ML algorithm for that ensemble member as contribution to the ensemble. This is contrasted with the bagging approach where the observations are selected from a uniform distribution and there is no guarantee that all observations will be included in the training. In accordance with one or more embodiments of the present invention, a data balancing step is included in the data transformation process to improve the identification of decision boundaries in each ML training subset, and not all observations must be included. One or more embodiments of the present invention can mimic bagging by first only including the block groups that contains all features, and then building the block sets according to bagging rules.

One or more embodiments of the present invention go beyond contemporary bagging approaches by allowing for a feature ladder, that is, features are added incrementally to the set of selected ensemble members. This can reduce the overall turnaround time of the process by only exploiting combinations of features that are improvements over the existing elite population. An elite population is a well-known concept in genetic algorithms, where the population size is limited to the best performing solutions (e.g. ensemble members) and the poorer performing ensemble members are discarded. This reduces the overhead of retaining the full set of ensemble members. The ensemble can complete with only a subset of the features, thus reducing turnaround time of the overall process. This can be viewed as a form of bottom-up principal component analysis (PCA). One or more embodiments of the present invention are designed to handle a very large amount of data, amounts that may exceed a single processors memory capacity, also to utilize a heterogeneous platform of nodes with different node capacity and throughput, as well as different computer architectures built on different instruction sets.

A further contemporary approach to ML training is referred to as "boosting" which provides for a linear combination of weak learners. As weak learners are added to the combination, the observations in the data are weighted up or down to reduce the error in the subsequent weak learner. All features and all rows are included in the training and thus, this process is not designed for analysis of a massive amount of data. In contrast to boosting, one or more embodiments of the present invention treat the weak learners as independent and their results are vote weighted, and features are included incrementally and in many combinations as the ensemble is constructed.

A further contemporary approach to ML training is a random forest and random subspace method. A random forest is an ensemble of decision trees where the features selected at each decision node are chosen from a randomly selected set of features. This is contrasted with one or more embodiments of the present invention where the selection of features is fixed for the ensemble member. As processing proceeds, the increasing inclusion of features above what already has been used is based on an elite population. For instance, a member of the elite population has the set of features assigned to that ensemble member and it is a subset of the overall set of features available from the data. Creating a new ensemble member from members of the elite population would encompass selecting an additional feature to include that is not already a part of the existing ensemble member and where the new ensemble member is a distinct combination of features. Basing combinations of features on the elite population extends the ensemble member coverage across the set of probable best performing combinations.

One or more embodiments of the present invention can mimic a random forest as one of the supported ML algorithms.

Turning now to FIG. 1, a high level flow diagram 100 of a ML training and testing system is generally shown in accordance with one or more embodiments of the present invention. At block 102, ML training data is received. The ML training data includes a plurality of features (including at least one class variable feature that the ML algorithm is being trained to predict based on one or more of the other features) for a plurality of observations. At block, 104, the ML training data is broken apart into a plurality of non-overlapping subsets of observations. Each of the subsets can be designated as training data, second level validation data, or test data. Each of the subset can also include a subset of the features in the ML training data. At block 106, a plurality of ML algorithms is trained in parallel (e.g., overlapping in time) on each of the subsets of observations included in the training data. At block 108, the plurality of ML algorithms is tested using the second level validation data and at block 110 one (or more) of the ML algorithms are selected based on results of the testing. In accordance with one or more embodiments of the present invention, the results of the testing include an error level that indicates an accuracy of the ML algorithm prediction of the class variable feature based on the other features. At block 112 the selected ML algorithm is retained as a best ML algorithm for predicting the class variable feature based on the other features.

In accordance with one or more embodiments of the present invention, blocks 106 through 112 are performed for multiple different subsets of the features in the received ML training data. In accordance with one or more embodiments of the present invention, blocks 106 through 112 are performed for some or all the possible subsets of the features in the received ML training data.

In accordance with one or more embodiments of the present invention, blocks 106 and 108 are performed until a user defined error threshold is reached.

Following is a more detailed description of the processing performed by the ML training and testing system in accordance with one or more embodiments of the present invention. The processing is described in terms of components that include a primary process, a health checker, a data manager, a compute farm, and a test center.

Initialization

The primary process begins by identifying what resources are available to be used to support the overall process. Either a homogenous platform, such as a dedicated cluster, or a heterogeneous mix of compute nodes such as from a grid or the cloud, can be used, or some combination of the two. The possibility of nodes entering and leaving the platform at any time is accounted for by one or more embodiments of the present invention by, for instance, the user entering an interactive command into the primary process to direct the addition of nodes to the platform, or the removal of nodes, or the removal of failing nodes signaled by the health checker. A set of idle nodes, or their potential, are first established, these are nodes that are available for allocation to the data manager, the test center, and to the compute farm as needed. The health checker component performs a ping to each idle node and informs the primary process of the performance expectation of the network topology of reaching each node. The scheduler component maintains knowledge of compute node status to optimize processing. Parameters are input for subsequent downstream processes. The initial source of training data is identified, and its structural content is described.

Data Transformation

Figure 2:
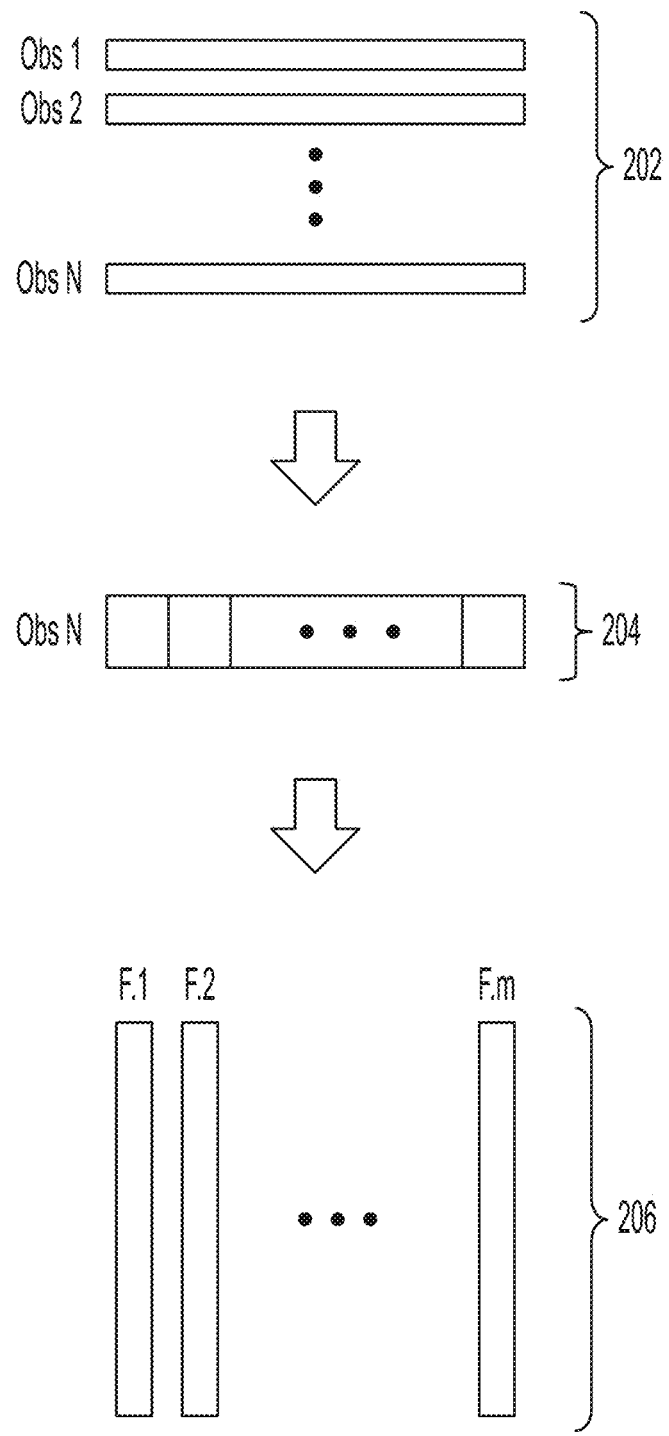
FIG. 2 depicts training data in accordance with one or more embodiments of the present invention.

The data transformation process constructs the data manager component. The set of training data that is input to the ML training and testing process is typically formatted as rows (each row represents an observation) and columns (each column represents a feature) of data as shown in element 202 of FIG. 2. FIG. 2 depicts input training data stratified by observations in element 204. As shown in element 204, each observation includes one or more features including a class variable feature which classifies the observation. If required, any known method of univariate statistics can be calculated for each feature to enable standardization or normalization of the data values. The data is then split by feature, which as shown in element 206 of FIG. 2 which represents the data in column format.

For example, it may be desired to train a ML algorithm to identify a specie (e.g., *setosa*, *versicolor*, or *virginica*) of an Iris, based on one or more observed features of an iris such as, sepal length, sepal width, petal length, petal width, and color. It may not be known which of these features are useful for determining, or classifying, the specie of an iris. In this example, element 202 would include a training data set, where each row includes the observed features for an iris as well as a class variable feature identifying the specie of the iris for that observation. Element 204 shows one row, or observation, from the data set. In this example, F.1 of element 206 would include the sepal lengths of all of the observations in the input data set in the same order as they were in the input data set, F.2 of element 206 would include the sepal widths of all of the observations in the input data set in the same order as they were in the input data set, etc.

Figure 3:
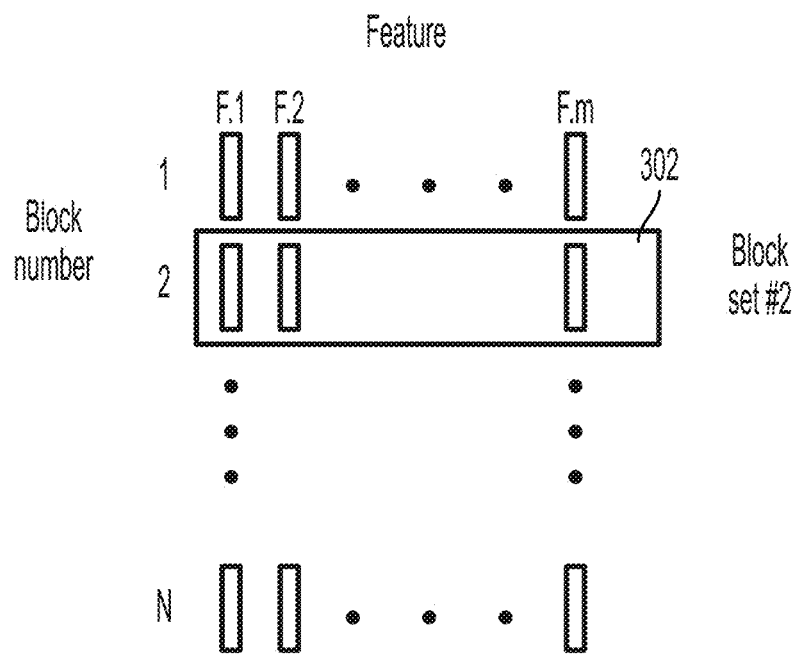
FIG. 3 depicts split-by-feature training data fragmented by block in accordance with one or more embodiments of the present invention.

The split-by-feature data of element 206 is then fragmented by block as shown in FIG. 3. As shown in FIG. 3, each block set 302 includes a plurality of observations with feature values across the full set of features where the observations maintain the original row coherency (i.e., they are in the same order as the input training data. Each block set represents a sampled portion of the full data.

Figure 4:
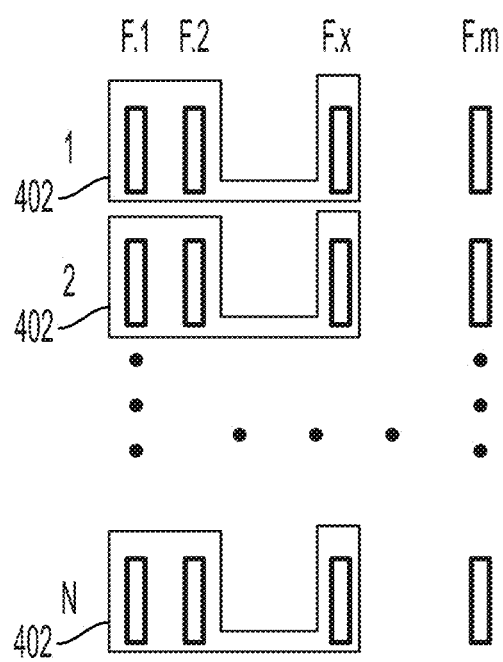
FIG. 4 depicts block groups according to ensemble memory features in accordance with one or more embodiments of the present invention.
Figure 5:
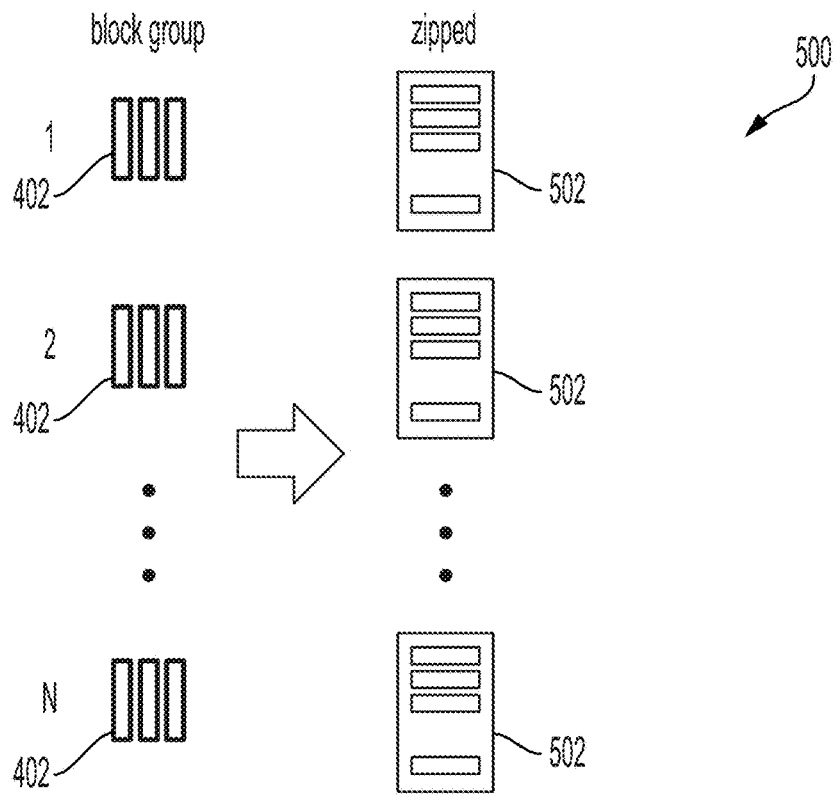
FIG. 5 depicts block groups zipped into rows in accordance with one or more embodiments of the present invention.

In accordance with one or more embodiments of the present invention, an ensemble is composed of ensemble members, each of which has a distinct combination of features from the input training data. The block groups 402 shown in FIG. 4 are for an ensemble member that has three features: F.1, F.2, and F.x. As shown in FIG. 4, the block groups 402 are logical combinations of blocks according to the ensemble member features. Each block group 402 contains at least a subset of the features in block set 302, including the class variable feature (s) from the input data set. As shown in the process 500 of FIG. 5, each of the block groups 402 are zipped into rows 502 for subsequent ML processing. Each row 402 represents the features of interest to an ensemble member for an observation in the block set 302. As shown in FIG. 5, there are multiple block groups 402 per ensemble member, one derived from each block set 302.

Returning to the previous example, assume that the ensemble member features are sepal length, petal length, and specie. In this example, each row in a block group zipped into rows for ML processing includes an observed value of a sepal length and a petal length as well as the specie. This ensemble member can be used to test whether the combination of sepal length and petal length can be used to predict one or all of the species. In accordance with one or more embodiments of the present invention, the correspondence between the rows in the block groups and the original row(s) from the input data set is maintained during the entire ML training and testing process.

Figure 6:
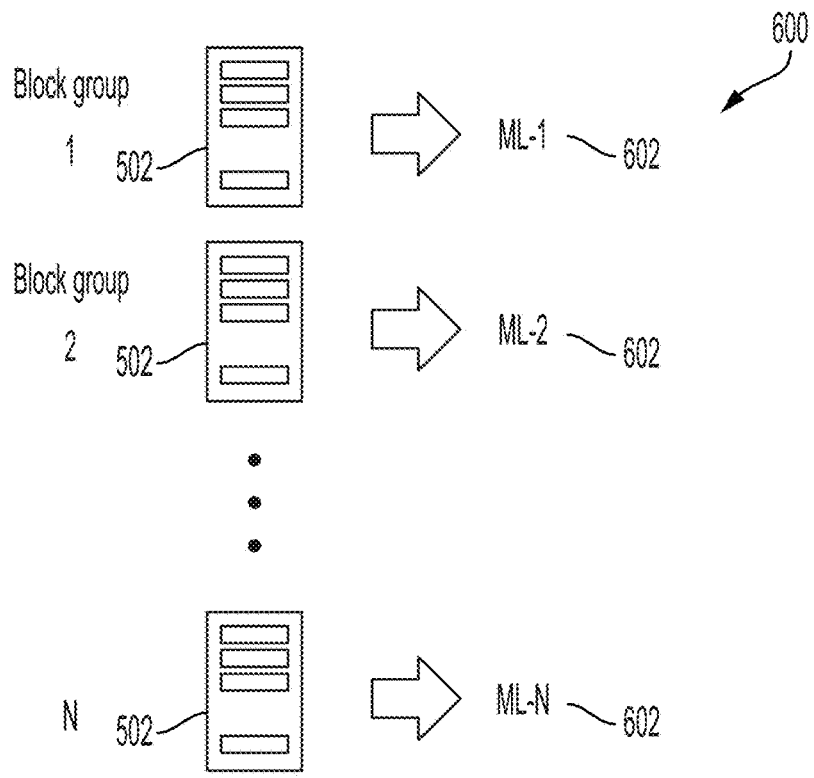
FIG. 6 depicts inputting block groups for an ensemble member into independent ML processes in accordance with one or more embodiments of the present invention.

Turning now to FIG. 6, a process 600 for inputting block groups 502 for an ensemble member into independent ML 602 processes for training is generally shown in accordance with one or more embodiments of the present invention. As shown in FIG. 6, there is at least one ML process 602 for each block group 502.

In accordance with one or more embodiments of the present invention, the ML processes are weak learners in the sense that they are only looking at a subset of observations and a subset of features. Since a weak learner has a limited view of the data, data balancing methods can be used to improve the chances of an algorithm reaching satisfactory results for a block group. For example, the representational balance of class variable content, or the range of regression values, can be used to determine which observations are in a block set.

Data transformation parameter values can be used by the data manager component. Examples of data transformation parameter values include but are not limited to: the number of observations per block set, the number of blocks per feature, sampling method (e.g. class balance), and standardization or normalization.

In accordance with one or more embodiments of the present invention, the block sets are split between training, second level validation, and test sets, as determined by the parameters. For example, 70% of the data may be used for training, 15% for second level validation, and 15% for test sets. Parameters can be used to set these percentages to any numbers. The second level validation set refers to the set of data used to determine the best performing trained ML algorithm for a given ensemble member. The first level validation set is embodied within each block group and the individual algorithm process may either split between training and validation or use k-fold cross validation where each fold is independent of the other folds and can be processed in parallel with the other folds. This can be driven by a parameter value, for instance a properties file entry "cross-validation=5" would indicate that k-fold cross validation of 5 is required.

Figure 7:
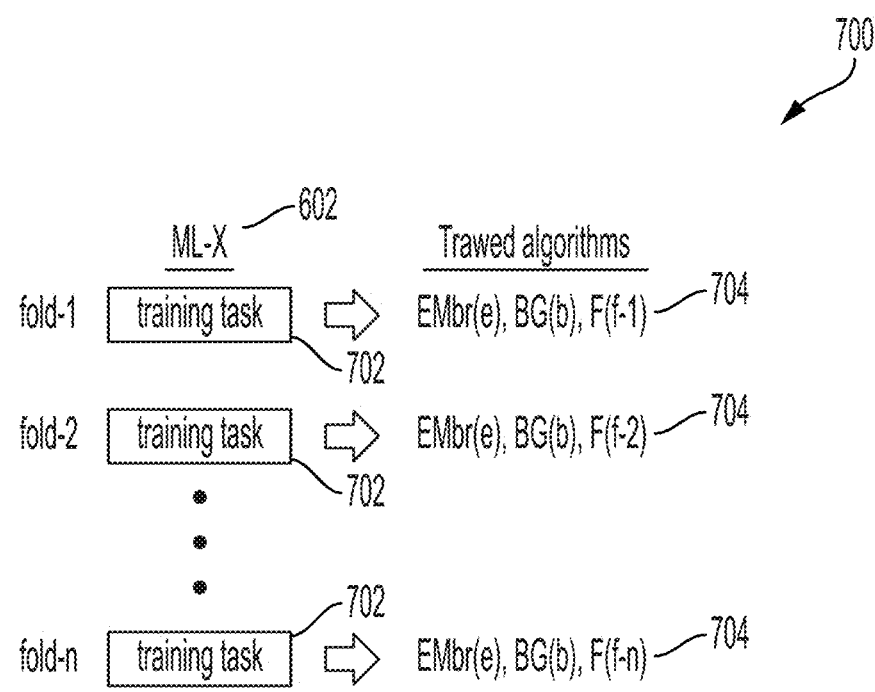
FIG. 7 depicts the use of k-fold cross validation in accordance with one or more embodiments of the present invention.

Turning now to FIG. 7, a block diagram of a process 700 for performing k-fold cross validation is generally shown in accordance with one or more embodiments of the present invention. As shown in FIG. 7, when k-fold cross validation is used, each ML process 602 will trigger "k" training tasks 702. The trained ML algorithms 704 can be unloaded and transmitted to the test center. As shown in the trained ML algorithms 704 of FIG. 7, EMbr(e) is the ensemble member, BG(b) is the block group of this ensemble member, and F(f-x) is the fold number of the block group.

In accordance with one or more embodiments of the present invention, the data manager holds all the data blocks for the analysis and the data is distributed across one or more data manager nodes. Each node is allocated from an initial set of idle platform nodes from the platform. These nodes can be centrally located to enable better network transmission performance when copying data to the compute nodes for processing. To improve recovery in case of data management node failure, there can be multiple copies of each block distributed to multiple nodes. For improved performance, the data blocks can all be retained in memory, which will remove disk latency as well as disk transfer time from block transmission. Platform limitations may require that only highly referenced blocks be retained in memory with an LRU type algorithm. In accordance with one or more embodiments of the present invention, the data manager sends blocks to the compute nodes of the compute farm and the test center nodes of the test center as directed by the scheduler.

The Ensemble

In accordance with one or more embodiments of the present invention, an ensemble includes the set of ensemble members retained in a population of elite performers. Each ensemble member has a vote weight associated with it based on the error calculated by the test center using the second level validation data. In addition, there can be an error threshold associated with the overall performance of the ensemble, as well as other stopping criteria (e.g., a limit on the number of features in an ensemble member which is called the ensemble member size, or the elapsed time of processing). Upon stopping, the ensemble can serialize to a stream or disk for retention outside of the training process. The serialized ensemble can be reinstated in a different software system for use as an induction machine.

In accordance with one or more embodiments of the present invention, the primary process initiates the ensemble by setting the ensemble member size, which is a parameter value. A new ensemble member can be generated for each possible combination of features for this initial ensemble member size and is submitted to the pipeline. The ensemble enters a wait state until a relevant event occurs, such as checkpoint or pipeline low threshold.

When a pipeline low threshold event occurs, the ensemble can generate a set of new ensemble members to put pending work into the pipeline. It is possible that a parameter signals the pipeline to wait until it is emptied which will then trigger a checkpoint event. After the checkpoint event (and the poor performing members of the population have been removed) the pipeline may be filled with new ensemble members.

The pipeline is used to hold ensemble members yet to be released to the compute farm. As ensemble members are initiated they will ask the scheduler for compute resources given the features and blocks to be processed. The scheduler will allocate compute node resources for the ensemble member then direct the data manager to distribute the needed blocks to the assigned compute nodes. The computational threads on the compute nodes are assigned for ML execution, and the scheduler directs the compute nodes to begin execution of the training. The compute node will first zip the associated blocks into a coherent set of data to be organized by observation, and the machine learner can operate without knowledge of the infrastructure supporting the overall process. If a split between training and first level validation is specified, the main process on the compute node will perform the task before driving the ML algorithm.

In accordance with one or more embodiments of the present invention, the test center receives completed trained algorithms in a serialized or unloaded form. Trained algorithms being passed through the system are unloaded if the architecture of the training compute node does not match that of the test center nodes and communication between the two cannot be binary direct but must be more of a symbolic nature such as with PMML or PFA. The trained algorithm will be reconstituted by the test center and the second level validation level will be processed by the test center to determine its performance. The test center can identify the best performing candidate trained ML result for a given ensemble member as it occurs and will transmit the trained algorithm in unloaded format along with its error value to the ensemble. If the ensemble member is already part of the population, the ensemble will update the entry in the population with the new best performer. If this ensemble member is not part of the population, it will be entered as a new member of the population. The population will expand temporarily during execution as new ensemble members are entered.

In accordance with one or more embodiments of the present invention, when a checkpoint event occurs, the ensemble of one or more embodiments of the present invention can have the population temporarily lock out arriving updates so as to prevent updates to the population while the checkpoint proceeds and any arriving entries will be placed in a population pending list. The ensemble organizes the population by performance criteria (the second level validation reported error). The maximum population size is specified by parameter, and the ensemble removes those ensemble members from the population that fail to stay in the elite set. The ensemble calculates the vote weights for each remaining ensemble member based on their error.

The ensemble can then send the unloaded ML algorithms with their vote weights to the test center to have the overall ensemble error calculated against the test data. This is reported back to the ensemble. Should the resultant error be below the user defined threshold or another stop criterion is reached, the ensemble is considered complete. The ensemble then unloads itself for use outside of this process, for example as an induction machine. The results can be used to show the effect of using different ML algorithms against the same data or can be used to reduce the set of features collected for the induction machine or can be used to signal additional training is needed, or that the size of the block sets in terms of number of observations needs to be altered.

Subsequent to the initial exhaustive filling of the pipeline, the ensemble member generation is based on the population. With a now larger ensemble-member-size, only those members of the population that are the size-minus-one can be used as a basis for new combinations of features. The ensemble tracks late arriving updates to the population from the size-minus-one entries that were either locked out during checkpoint processing or were in process but had not yet been sent to the ensemble's population. The entries that are delayed could drive the creation of new members to the population, and if so the ensemble derives new members from them and adds them to the pipeline.

The ML Algorithm

As described previously herein, a block group is the set of observations of the same block set (or multiple block sets) but with the features constrained to those assigned to the ensemble member. The block group is assembled, as shown in FIG. 5 for example, at the compute node by zipping the assigned blocks together as a whole. Row coherency is maintained between the original training data input to the system and the block group(s). Both input and output (e.g., the class variable feature) features are included to perform training and first level validation.

Each block group of the ensemble member is independent of all other block groups and can be processed in parallel. Should k-fold cross validation (CV) be used, each fold itself is independent of all the other folds and can be processed in parallel. The k-fold CV puts k times the computational demand on the platform, as each fold of the block group is used to train an independent ML algorithm. The scheduler optimizes resource consumption of the platform and can replicate block groups into the compute farm to spread the computation of k-fold CV of a single ensemble member across many compute nodes and directs data blocks to their assigned nodes. If there are resource constraints in the compute farm, the scheduler doesn't necessarily drive all block group calculations at once. In accordance with one or more embodiments of the present invention, the scheduler maintains a picture of resource availability and the presence of data blocks on compute nodes. The scheduler can dequeue the pending work and deliver the work as a task to the selected compute nodes in an optimal plan. This optimal plan can include a data block distribution task to position the data on the compute node ahead of processing or the compute node itself may already have the block archived on disk and needs to promote it to a memory buffer from disk for processing.

The ML algorithm trains according to parameters, adhering to stop criteria. Once the ML algorithm has completed, the compute node sends an unloaded copy of the trained ML algorithm to the test center, as shown for example in FIG. 7, and the compute node notifies the scheduler that it has completed the task and resources are now available. Should the ML algorithm use k-fold CV, each fold is sent as a separate potential result for the test center to measure and consider for best performing of the ensemble member. When the compute node completes its portion of the ensemble member, the block group's blocks are released to the compute node's data block LRU algorithm.

As ensemble member size increases (e.g., the number of features included in each ensemble member increases) it may be appropriate to alter the algorithms parameters. Factors such as, but not limited to, stop criteria may be changed.

Test Center—Ensemble Member Validation

Figure 8:
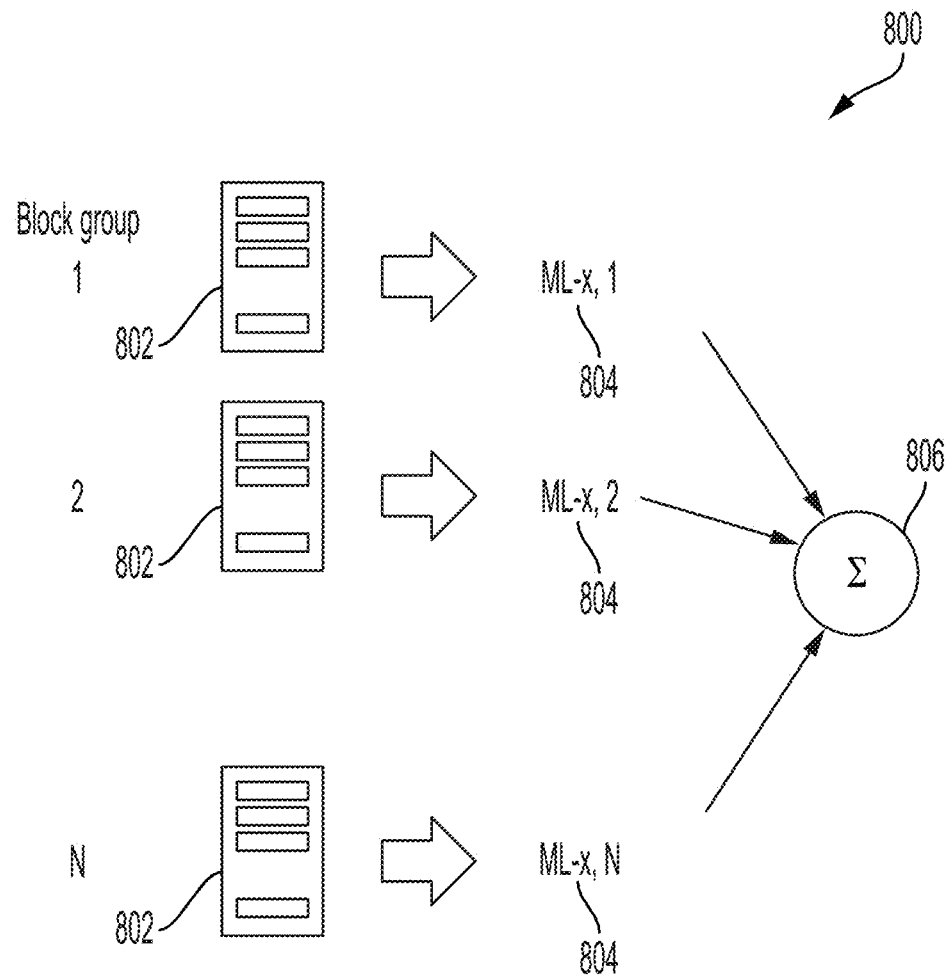
FIG. 8 depicts test center second-level validation in accordance with one or more embodiments of the present invention.

Turning now to FIG. 8, a block diagram of a process 800 of test center second-level validation is generally shown in accordance with one or more embodiments of the present invention. As shown in FIG. 8, ensemble members processing on the compute nodes transmit a trained ML algorithm(s) 804 in an unloaded format to the test center. The trained ML algorithm 804 is reinstated by the test center and is used to process against the full set of second level validation data that was retained by the test center. The test center maintains the full block set for each block number of the second level validation data. The test center process must first identify only those feature blocks that will be used by the ensemble member undergoing testing. Those blocks are then zipped together as row coherent entries 802 to be passed into the ML algorithm 804 as it runs in test mode. The error for each passed in observation is accumulated 806 and the overall ensemble member error for this trained machine learning algorithm is the result. The test center retains a best error value for each ensemble member. If this is a new best error algorithm for the ensemble member, the error and unloaded algorithm are forwarded to the ensemble for retention.

Each test center task performing a validation step on the arriving trained machine learning algorithm 804 is independent of all other test center tasks. The test center can distribute the validation data block sets across multiple nodes and can have multiple copies of the block sets for performance optimization. The ensemble member validation threads of the block groups are independent and can be processed in parallel and accumulated on completion of each block group process.

Determining Vote Weights

At user determined intervals, the ensemble checkpoints progress. All updates to the population are deferred until checkpoint processing is complete. The population candidates are added to the population in order by error. Those members that exceed the maximum population size are removed from the population. Each ensemble member in the population has its vote weight calculated based on its error. Should a population member's vote weight fall below a user defined threshold, then the member can be removed from the population and vote weights are then recalculated. This can continue iteratively until all vote weights are at or above the vote weight threshold. As part of checkpoint processing, the ensemble can then serialize its contents to a stream or disk by sending its unloaded ML algorithms and the vote weights which can then later be used to restart the process. The unloaded ML algorithms and vote weights are transmitted to the test center for overall ensemble performance measurements.

Test Center—Ensemble Accuracy and Termination

In accordance with one or more embodiments of the present invention, checkpoint processing by the ensemble transmits the entire ensemble member population and vote weights to the test center. The test center retains the test set of data separate from the second level of validation data. The test set is used for overall ensemble test measurement. The test center reinstates the ensemble members and processes each observation of the test data against each ensemble member and its vote weight. The summed results of the entire suite of ensemble members for a single observation is the ensemble's output for that observation and this is compared to the observations true output value to gain the computed error for that observation. The resultant accumulated error of all observations is the overall error of the ensemble. This is reported back to the ensemble where the accuracy is compared to a target threshold. This can cause the ensemble process to terminate successfully.

Health Check

In accordance with one or more embodiments of the present invention, independent of other processes, the health check contacts each of the nodes that are operating on the platform. The time between queries can be dependent on node locality. Nodes that don't respond within a threshold time are considered failed and are removed from the system component they are part of. The scheduler is notified of node status.

If the failing node is part of the compute farm, then it is possible that there are multiple ensemble member block group ML training calculations that have been abandoned and need to be restarted on another compute node. The work is re-queued for execution.

If the failing node is part of the test center, then another node may be needed to replace the failing node. It is possible that the remaining test center nodes can pick up the slack, though at reduced throughput. Test center processes that are impacted by the failing node will be restarted. If the node that failed was responsible for tracking the best retained instance of the ensemble members, it can be rebuilt from either the ensembles information, or from a mirror of the tracking information on another test center node. If rebalancing of test center nodes is needed because of failing test center nodes, then block sets may be relocated. If a new node is added, then its arrival will also trigger a rebalance effort. Some test center processes may need to be restarted.

If the failing node is part of the data management component, then an idle node may be assigned to replace the failing node. If the data was replicated across multiple nodes the system can continue to process while a rebuild of the failed node is performed. In one or more embodiments of the present invention, if one or more blocks are no longer present in the data management component, then this will cause a whole system failure and the system will need to start over.

The health check can also ask for performance statistics from the three processing components that contain active nodes: the compute farm, the data manager, and the test center. Statistics are not necessarily gathered at the same interval as a health check ping. The statistics are for use by the scheduler as it optimizes processing. Performance statistics can include, but are not limited to: available compute resources, memory usage, time to process a single iteration, and network latency measurements.

It is possible that the user enters or removes processing nodes from the platform at any time. This is an activity that the user interface on the primary process supports and passes into the system to act on. In response to a failing node, the system may quiesce an active node in one component, make it an idle node, and then move it to another component. In accordance with embodiments, the priority of nodes is data manager above test center above compute farm.

Scheduler

In accordance with one or more embodiments of the present invention, the scheduler optimizes the use of the platform to achieve maximum throughput. Over initiating work can lead to thrashing of processes on the compute nodes, and under initiating doesn't exploit the platform fully. Feedback from compute nodes about their performance via the health checker is used to schedule work onto compute nodes, to stage blocks from data management nodes to compute nodes and have the test center adjust placements of its block sets.

Over density on data management nodes can cause delays in the compute farm because of data management node contention, possibly disk access delays, or localized network contention. Over density in the test center can cause system delays as ML algorithm performance is degraded due to resource contention.

The locations of each data block are known to the scheduler so that it can optimize placement of data in the compute farm. The data manager and test center are responsible for data block placement in their respective node pools and can access the scheduler's information on resource usage to determine optimal placement of their data blocks.

Figure 9:
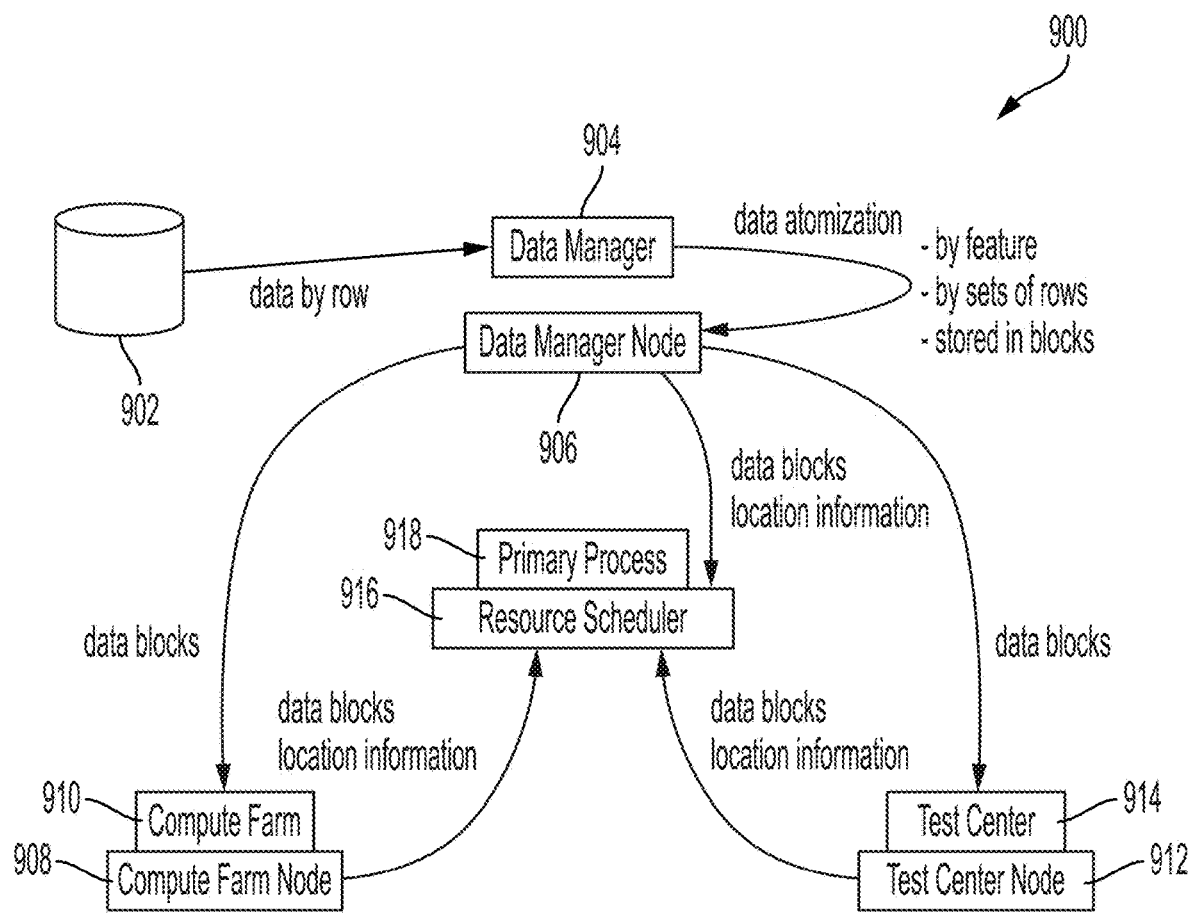
FIG. 9 depicts data movement between components of a ML training and testing system in accordance with one or more embodiments of the present invention.

Turning now to FIG. 9, data movement 900 between components of the ML training and testing system is generally shown in accordance with one or more embodiments of the present invention. FIG. 9 shows the input training data 902 that is input to the system and includes data in rows, with each row representing an observation and each column a feature. The input training data 902 is input to a data manager 904 which executes on a data manager node 906 to reformat the input training data 902 as described herein and storing the results as data blocks. As shown in FIG. 9, the data manager node 906 transmits the data blocks to a compute farm node 908 in a compute farm 910, and to a test center node 912 of a test center 914. Location information is also sent from the data manager node 906 to the resource scheduler 916. Both the computer farm node 908 and the test center node 912 provide data block location information back to the resource scheduler. The location information can include what node the block is on, whether the block is in memory, whether the block has a copy on disk. The scheduler uses the block information to optimize overall system throughput and turnaround.

Figure 10:
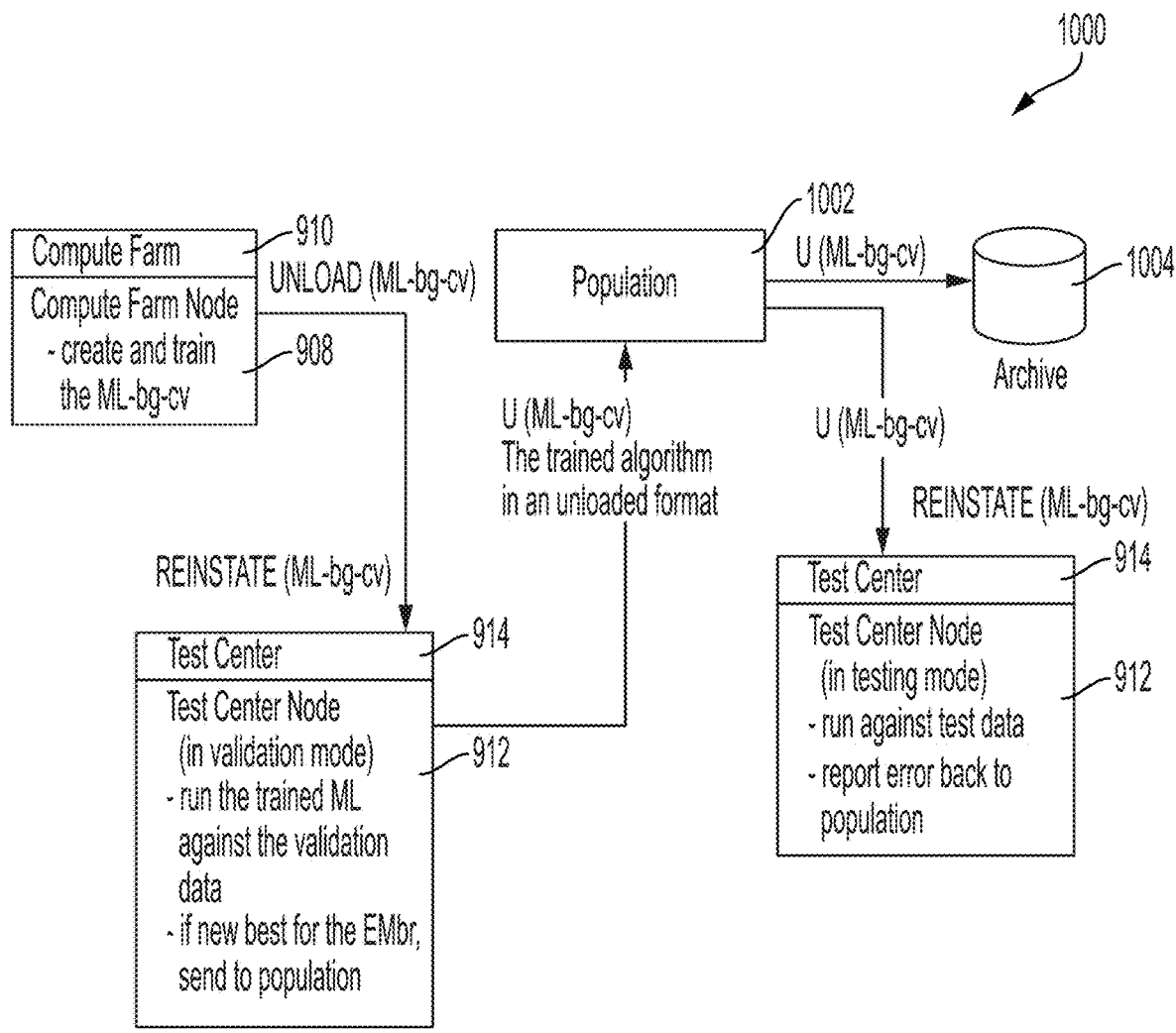
FIG. 10 depicts ML algorithm movement between components of a ML training and testing system in accordance with one or more embodiments of the present invention.

Turning now to FIG. 10, ML algorithm movement 1000 between components of the ML training and testing system is generally shown in accordance with one or more embodiments of the present invention. As depicted in FIG. 10, "ML" is the ML algorithm, "bg" is the block group (the blocks of data for a given subset for the features of the ensemble members), and "cv" is the cross validation number. An ML algorithm is created and trained on a compute farm node 908 of a compute farm 910, and then unloaded and sent to the test center 914 which distributes it to one or more test center nodes 912 (executing in validation mode) of a test center 914 where the algorithm is reinstated. The test center nodes 912 run the trained ML algorithm against the validation data and if the results indicate that the trained ML algorithm is a new best (e.g., has a lowest error level) for its corresponding ensemble member, then it is sent in an unloaded format to a population 1002. The population is a collection of ensemble members which have completed some or all their training tasks that are associated with individual block groups, along with the error calculation from the second level validation data. The population can be limited in size to an elite set of ensemble members according to their error values. The population 1002 will send the ML algorithm to the test center 914 where it is distributed to test center nodes 912 (executing in a testing mode) of the test center 914 where it is reinstated. The test center nodes 912 run the trained ML algorithm against test data and report the aggregated error value back to the population 1002. The population 1002 saves the ML algorithm into an archive 1004 when directed by the user through interactive command or parameter value, or at a checkpoint event, or upon successful completion of the overall process.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
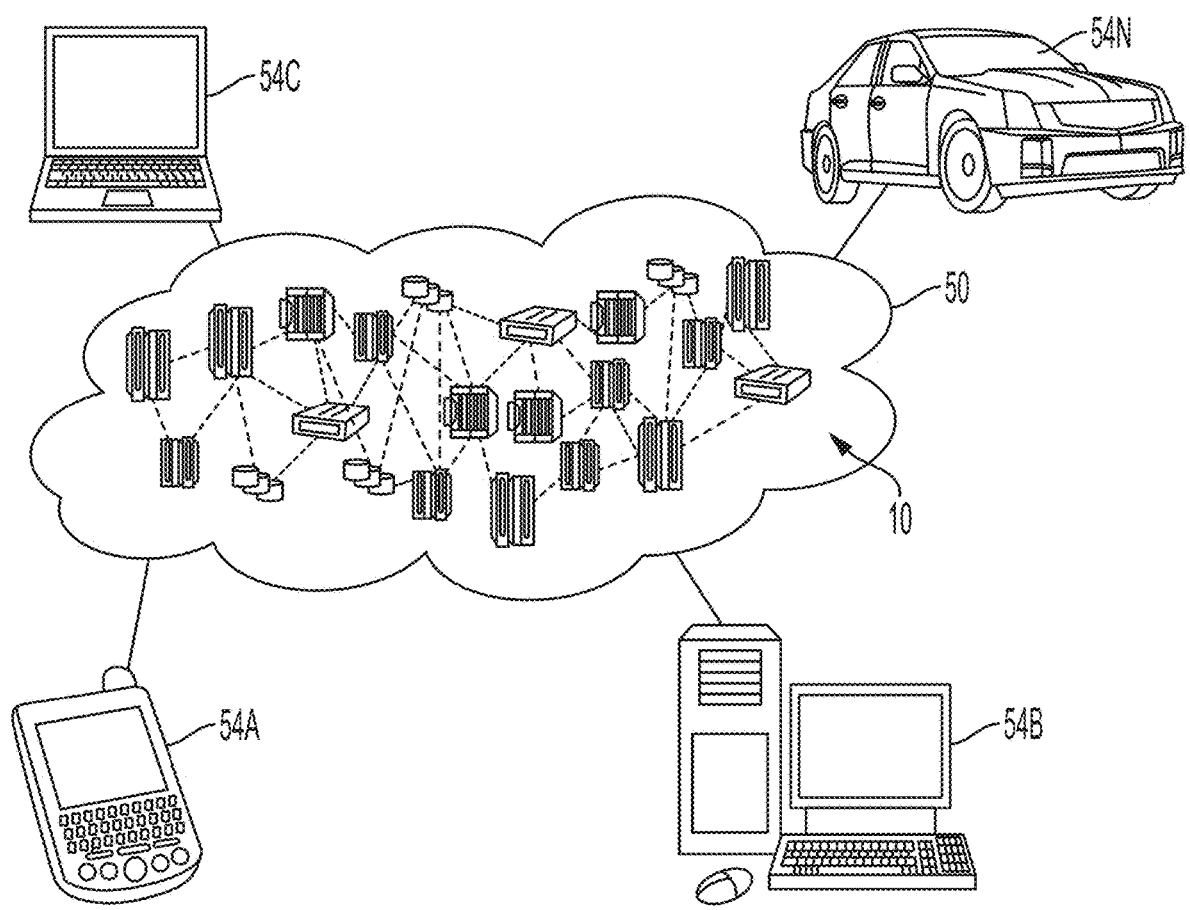
FIG. 11 depicts a cloud computing environment according to one or more embodiments of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
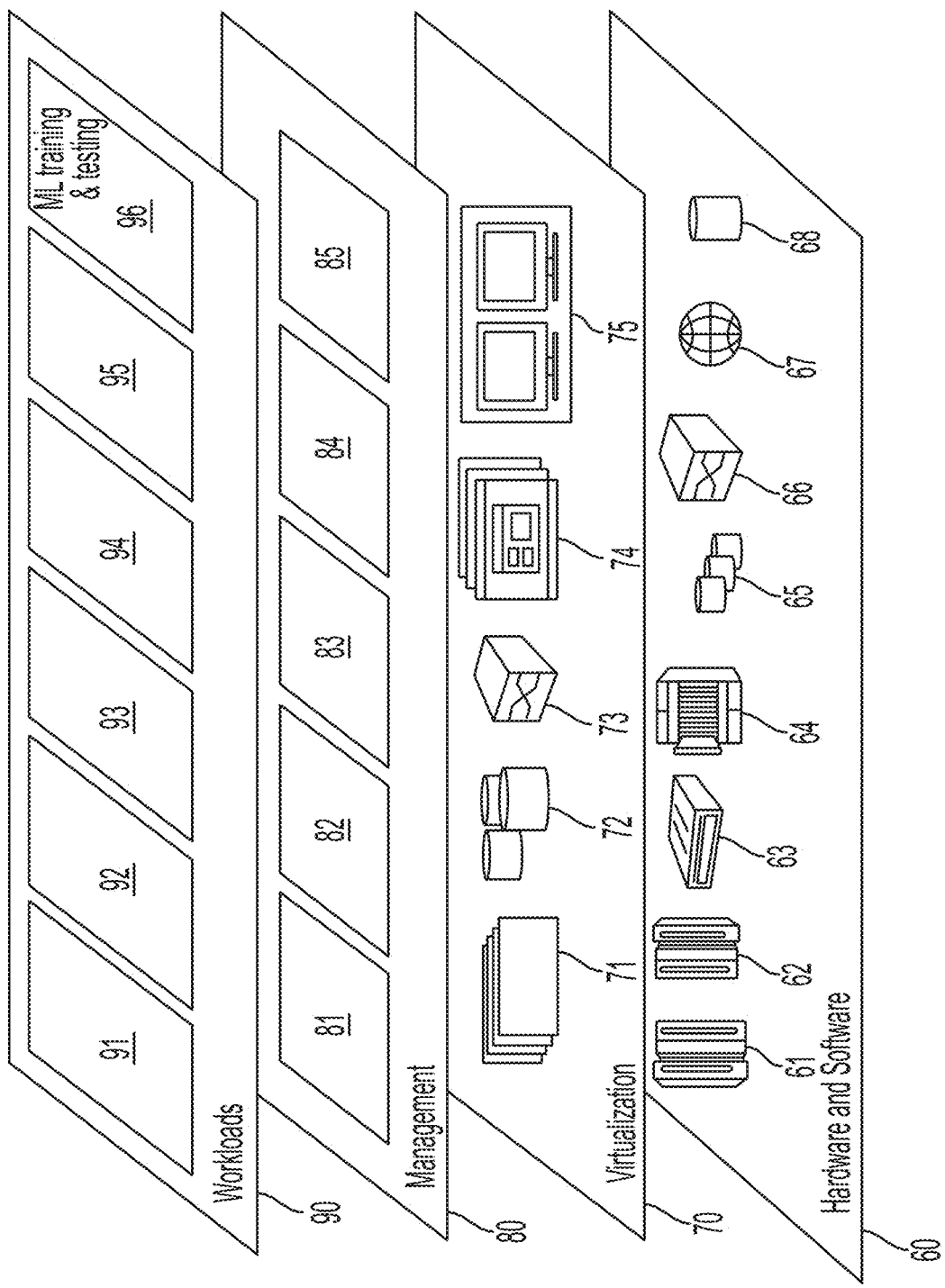
FIG. 12 depicts abstraction model layers according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 include hardware and software components. Examples of hardware components include: mainframes 611; RISC (Reduced Instruction Set Computer) architecture based servers 62; servers 63; blade servers 64; storage devices 65; and networks and networking components 66. In some embodiments, for example, software components include network application server software 67, database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ML training and testing 96.

Figure 13:
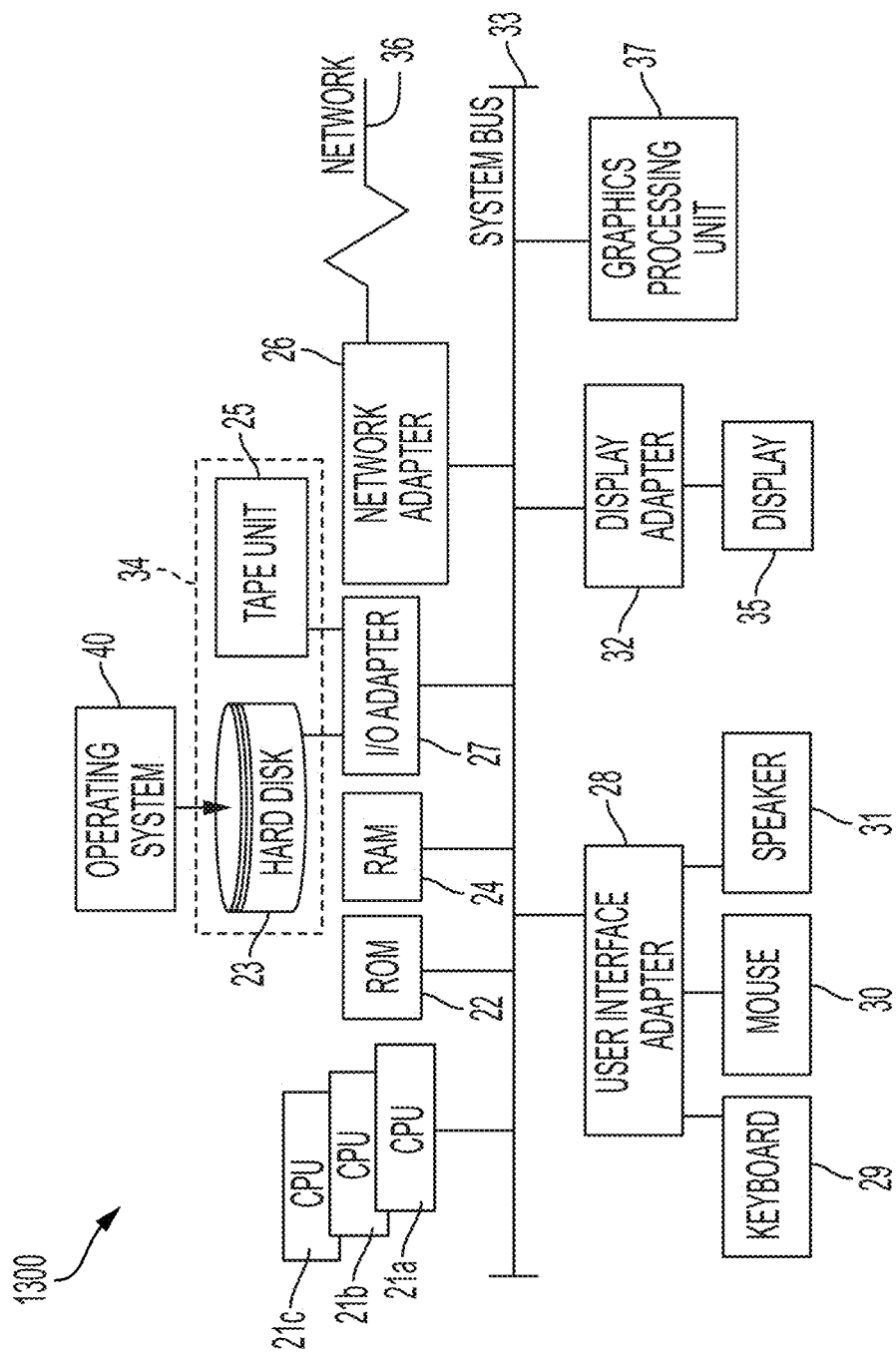
FIG. 13 depicts a processing system for implementing one or more embodiments of the present invention.

It is understood that one or more embodiments of the present invention are capable of being implemented in conjunction with any other type of computing environment now known or later developed. For example, FIG. 13 depicts a block diagram of a processing system 1300 for implementing the techniques described herein. The processing system 1300 is an example of a computing node 10 of FIG. 11. In the embodiment shown in FIG. 13, processing system 1300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 1300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 1300 can be stored in mass storage 34. The RAM 22, ROM 24, and mass storage 34 are examples of memory 19 of the processing system 1300. A network adapter 26 interconnects system bus 33 with an outside network 36 enabling the processing system 1300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 1300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 1300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 1300.

In accordance with one or more embodiments of the present invention, all or a subset of the processing described in reference to FIGS. 1-10 is performed by one or more computing node(s) 10 of FIG. 11.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, include the module and achieve the stated purpose for the module.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving machine learning (ML) training data comprising a plurality of features for a plurality of observations;
   breaking the ML training data into a plurality of non-overlapping subsets of features and observations;

training a first ML algorithm based on a first subset of the features and observations, and a second ML algorithm based on a second subset of the features and observations, the training of the first ML algorithm overlapping in time with the training of the second ML algorithm;

testing the first ML algorithm and the second ML algorithm;

selecting one of the first ML algorithm and the second ML algorithm based at least in part on results of the testing; and retaining the selected ML algorithm as a trained ML algorithm for predicting one or more of the plurality of features based on one or more other features of the other plurality of features.

2. The computer-implemented method of claim 1, wherein the results of the testing include an error level.

3. The computer-implemented method of claim 1, wherein the first and second subset include a same subset of the plurality of features.

4. The computer-implemented method of claim 3, wherein the training, testing, selecting, and retaining are repeated for multiple different subsets of the plurality of features.

5. The computer-implemented method of claim 3, wherein the training, testing, selecting, and retaining are repeated for all subsets of the plurality of features.

6. The computer-implemented method of claim 1, wherein the testing the first ML algorithm overlaps in time with the testing of the second ML algorithm.

7. The computer-implemented method of claim 1, wherein the training and testing are ML algorithm agnostic.

8. The computer-implemented method of claim 1, wherein the training and testing are repeated until a user defined error threshold is reached.

9. A system comprising:
   a memory having computer readable instructions; and
   one or more processors for executing the computer readable instructions, the computer readable instructions controlling the one or more processors to perform operations comprising:
      receiving machine learning (ML) training data comprising a plurality of features for a plurality of observations;
      breaking the ML training data into a plurality of non-overlapping subsets of features and observations;
      training a first ML algorithm based on a first subset of the features and observations, and a second ML algorithm based on a second subset of the features and observations, the training of the first ML algorithm overlapping in time with the training of the second ML algorithm;
      testing the first ML algorithm and the second ML algorithm;
      selecting one of the first ML algorithm and the second ML algorithm based at least in part on results of the testing; and
      retaining the selected ML algorithm as a trained ML algorithm for predicting one or more of the plurality of features based on one or more other features of the other plurality of features.

10. The system of claim 9, wherein the results of the testing include an error level.

11. The system of claim 9, wherein the first and second subset include a same subset of the plurality of features.

12. The system of claim 11, wherein the training, testing, selecting, and retaining are repeated for multiple different subsets of the plurality of features.

13. The system of claim 12, wherein the training, testing, selecting, and retaining are repeated for all subsets of the plurality of features.

14. The system of claim 12, wherein the testing the first ML algorithm overlaps in time with the testing of the second ML algorithm.

15. The system of claim 9, wherein the training and testing are ML algorithm agnostic.

16. The system of claim 9, wherein the training and testing are repeated until a user defined error threshold is reached.

17. A computer program product comprising a computer readable storage medium having program instructions embodied therewith, the program instructions executable by a processor to cause the processor to perform operations comprising:
   receiving machine learning (ML) training data comprising a plurality of features for a plurality of observations;
   breaking the ML training data into a plurality of non-overlapping subsets of features and observations;
   training a first ML algorithm based on a first subset of the features and observations, and a second ML algorithm based on a second subset of the features and observations, the training of the first ML algorithm overlapping in time with the training of the second ML algorithm;
   testing the first ML algorithm and the second ML algorithm;
   selecting one of the first ML algorithm and the second ML algorithm based at least in part on results of the testing; and
   retaining the selected ML algorithm as a trained ML algorithm for predicting one or more of the plurality of features based on one or more other features of the other plurality of features.

18. The computer program product of claim 17, wherein the results of the testing include an error level.

19. The computer program product of claim 17, wherein the first and second subset include a same subset of the plurality of features.

20. The computer program product of claim 19, wherein the training, testing, selecting, and retaining are repeated for multiple different subsets of the plurality of features.

* * * * *